United States Patent
Garner

(10) Patent No.: US 9,555,898 B2
(45) Date of Patent: Jan. 31, 2017

(54) HELICOPTER DOLLY

(71) Applicant: BOOST IDEAS LLC, Miami, FL (US)

(72) Inventor: Robert Garner, Miami, FL (US)

(73) Assignee: Boost Ideas LLC, Miami, FL (US)

( * ) Notice: Subject to any disclaimer, the term of this patent is extended or adjusted under 35 U.S.C. 154(b) by 127 days.

(21) Appl. No.: 14/721,058

(22) Filed: May 26, 2015

(65) Prior Publication Data

US 2016/0347475 A1 Dec. 1, 2016

(51) Int. Cl.
*B64F 1/00* (2006.01)
*B64F 1/22* (2006.01)
*B64F 1/02* (2006.01)

(52) U.S. Cl.
CPC .............. *B64F 1/007* (2013.01); *B64F 1/025* (2013.01); *B64F 1/224* (2013.01)

(58) Field of Classification Search
CPC ............. B64F 1/00; B64F 1/025; B64F 1/002; B65D 19/00; B65D 19/02; B65D 19/04; B65D 19/06; B65D 19/08; B65D 19/10; B65D 19/12; B65D 19/14; B65D 19/16; B65D 19/18; B65D 19/20; B65D 19/36; B65D 19/38; B65D 19/40; B65D 19/42; B65D 19/44; B65D 88/129; B62B 5/0093; B62B 3/04
See application file for complete search history.

(56) References Cited

U.S. PATENT DOCUMENTS 1,639,879 A * 8/1927 Buffington ................ B60P 1/43
296/57.1
2,573,728 A * 11/1951 Pugh, Sr. ................ B66F 7/246
280/79.4
3,009,711 A 11/1961 White
(Continued)

FOREIGN PATENT DOCUMENTS

DE 3100163 8/1982
DE 4002937 8/1991
(Continued)

OTHER PUBLICATIONS

Screenshot using Wayback Machine of Home Depot Website from May 5, 2014. Screenshot is of a utility cart with features simlar to the claimed invnention. http://www.homedepot.com/p/Farm-Ranch-900-lb-Capacity-Utility-Cart-FR1245-2/204141282?N=5yc1vZbx50Z1z0y17b.*
(Continued)

*Primary Examiner* — Timothy D Collins
*Assistant Examiner* — James Atwell
(74) *Attorney, Agent, or Firm* — Allen Dyer Doppelt Milbrath & Gilchrist

(57) ABSTRACT

A helicopter dolly includes a platform defining a helicopter landing area, a plurality of rollers connected to the platform such that a vertical clearance is defined between the platform and the ground and a plurality of safety panels movably connected to edges of the platform so as to be movable relative thereto between raised and lowered positions. The safety panels cover the vertical clearance in the lowered
(Continued)

position. A method of using a helicopter dolly includes arranging a helicopter dolly for a helicopter landing, moving a plurality of safety panels and a plurality of corner members to cover a vertical clearance defined between a platform and the ground and moving the plurality of safety panels and the plurality of corner members to uncover the vertical clearance after the helicopter landing.

20 Claims, 4 Drawing Sheets

(56) References Cited

U.S. PATENT DOCUMENTS

| | | | | |
|---|---|---|---|---|
| 3,048,147 | A * | 8/1962 | McKean | A01K 1/0245 |
| | | | | 119/496 |
| 3,807,035 | A * | 4/1974 | Moorman | B23Q 1/38 |
| | | | | 108/57.15 |
| 4,116,408 | A * | 9/1978 | Soloy | B64F 1/007 |
| | | | | 244/110 E |
| 4,121,788 | A * | 10/1978 | McMahon | B64F 1/22 |
| | | | | 180/198 |
| 4,682,750 | A | 7/1987 | Rudolph et al. | |
| 4,887,836 | A * | 12/1989 | Simjian | B62B 3/02 |
| | | | | 280/47.371 |
| 5,067,669 | A * | 11/1991 | Van Horn | B64F 1/36 |
| | | | | 244/114 R |
| 5,755,472 | A * | 5/1998 | Clive-Smith | B65D 88/129 |
| | | | | 108/53.1 |
| 6,135,031 | A * | 10/2000 | Heil | B65D 19/44 |
| | | | | 108/55.5 |
| 6,173,941 | B1 * | 1/2001 | Johnston | B60P 3/14 |
| | | | | 254/420 |
| 6,203,263 | B1 | 3/2001 | Hancock | |
| 6,733,026 | B1 | 5/2004 | Robberson et al. | |
| 6,824,152 | B1 | 11/2004 | Scott | |
| 6,863,488 | B2 | 3/2005 | Chopra | |
| 8,152,014 | B2 * | 4/2012 | Elstone, Sr. | B65D 19/12 |
| | | | | 220/4.28 |
| 8,336,807 | B2 * | 12/2012 | Hanafin | B64F 1/005 |
| | | | | 206/335 |
| 8,424,802 | B2 * | 4/2013 | Tripier-Larivaud | B63B 35/52 |
| | | | | 244/114 R |
| 9,096,363 | B2 * | 8/2015 | Reynard | B65D 88/129 |
| 9,108,656 | B1 * | 8/2015 | Nolan | B62B 3/02 |
| 2002/0108540 | A1 * | 8/2002 | Underbrink | B65D 19/42 |
| | | | | 108/55.3 |
| 2002/0179601 | A1 * | 12/2002 | Haruhiro | B65D 11/1833 |
| | | | | 220/6 |
| 2004/0256519 | A1 * | 12/2004 | Ellis | B64C 39/024 |
| | | | | 244/110 E |
| 2006/0226143 | A1 * | 10/2006 | Elstone | B65D 19/12 |
| | | | | 220/6 |
| 2008/0283661 | A1 * | 11/2008 | Henley | B60B 19/003 |
| | | | | 244/114 R |
| 2010/0059951 | A1 * | 3/2010 | Hadar | B62B 3/02 |
| | | | | 280/79.3 |
| 2010/0200694 | A1 * | 8/2010 | Tripier-Larivaud | B63B 35/52 |
| | | | | 244/114 R |
| 2010/0314849 | A1 | 12/2010 | Realegeno-Amaya | |
| 2010/0320313 | A1 * | 12/2010 | Hanafin | B64F 1/005 |
| | | | | 244/17.17 |
| 2012/0255802 | A1 | 10/2012 | Hancock | |
| 2016/0075362 | A1 * | 3/2016 | Della Polla | B62B 5/0093 |
| | | | | 280/79.11 |

FOREIGN PATENT DOCUMENTS

| | | | | |
|---|---|---|---|---|
| DE | | 4002937 A1 * | 8/1991 | B60P 3/0252 |
| JP | | 4334631 | 11/1992 | |
| KR | | 101033457 B1 * | 5/2011 | |
| WO | WO 2013185135 A1 * | 12/2013 | | B65D 19/00 |

OTHER PUBLICATIONS

Rotornews, National Guard Units Make HeliWagon Purchases, Feb. 26, 2014, https://www.rotor.com/Publications/RotorNews/tabid/843/articleType/ArticleView/articleId/4389/National-Guard-Units-Make-HeliWagon-Purchases.aspx.

* cited by examiner

HELICOPTER DOLLY

FIELD OF THE INVENTION

The present invention relates to helicopter dollies, and more particularly, to helicopter dollies configured to enhance safety when landing.

BACKGROUND OF THE INVENTION

Helicopter dollies are commonly used for landing and transporting helicopters on the ground. However, landing on a dolly can be extremely dangerous. Since it is difficult to see helicopter skids while trying to precisely land on the dolly, the skids may miss the dolly completely or can be caught in the space between the dolly platform and the ground. This landing mishap can cause helicopters to roll over and crash. Although various helicopter dollies have been used for helicopter landing, further improvements are possible.

SUMMARY OF THE INVENTION

In view of the foregoing, it is an object of the present invention to provide an improved manned helicopter dolly, as well as a related method of use. As used herein, a "manned" helicopter indicates having the capacity to transport one or more adult humans, whether or not such a helicopter is actually transporting such human(s).

According to an embodiment of the present invention, a helicopter dolly includes a platform defining a helicopter landing area, a plurality of rollers connected to the platform such that a vertical clearance is defined between the platform and the ground and a plurality of safety panels movably connected to edges of the platform so as to be movable relative thereto between raised and lowered positions. The safety panels cover the vertical clearance in the lowered position.

According to a method aspect, a method of using a helicopter dolly includes arranging a helicopter dolly for a helicopter landing, moving a plurality of safety panels and a plurality of corner member to cover a vertical clearance defined between a platform and the ground and moving the plurality of safety panels and the plurality of corner members to uncover the vertical clearance after the helicopter landing.

These and other objects, aspects and advantages of the present invention will be better understood in view of the drawing and following detailed description of preferred embodiments.

DETAILED DESCRIPTION OF PREFERRED EMBODIMENTS

Figure 1:
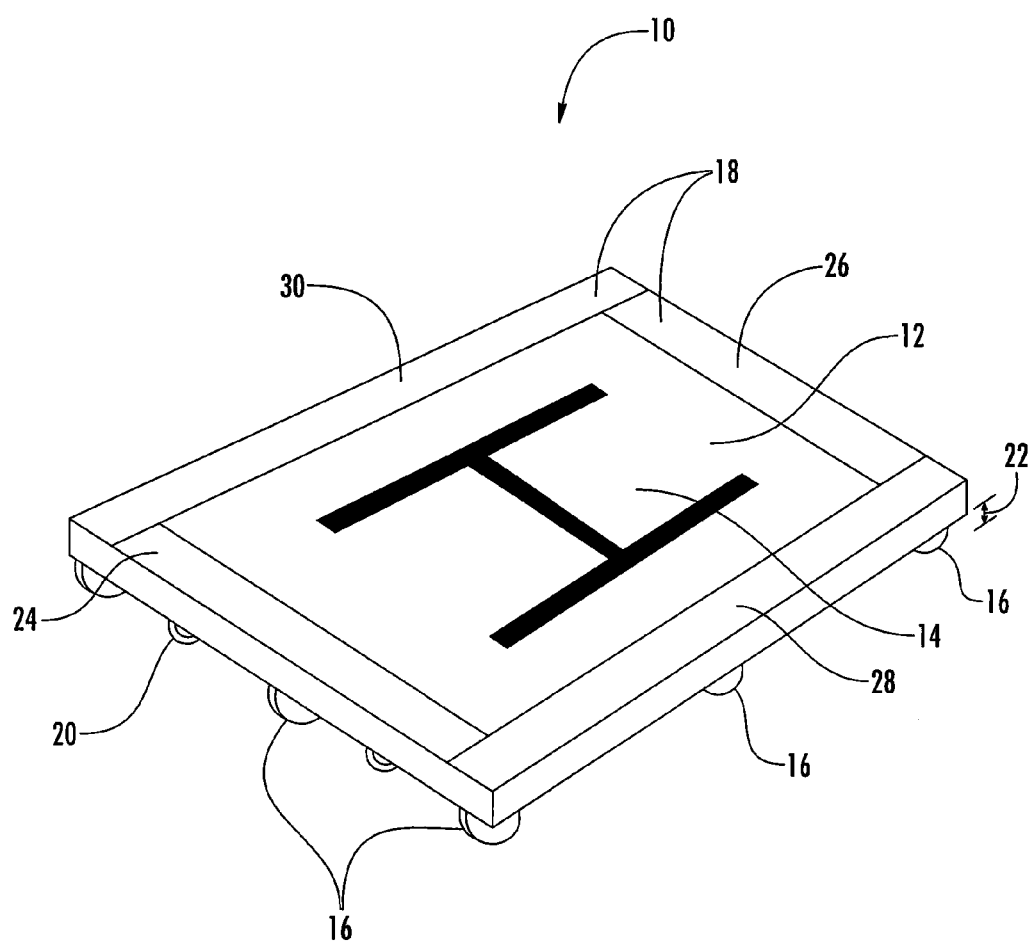
FIG. 1 is a perspective view of a dolly, according to an embodiment of the present invention, with a plurality of safety panels folded.
Figure 2:
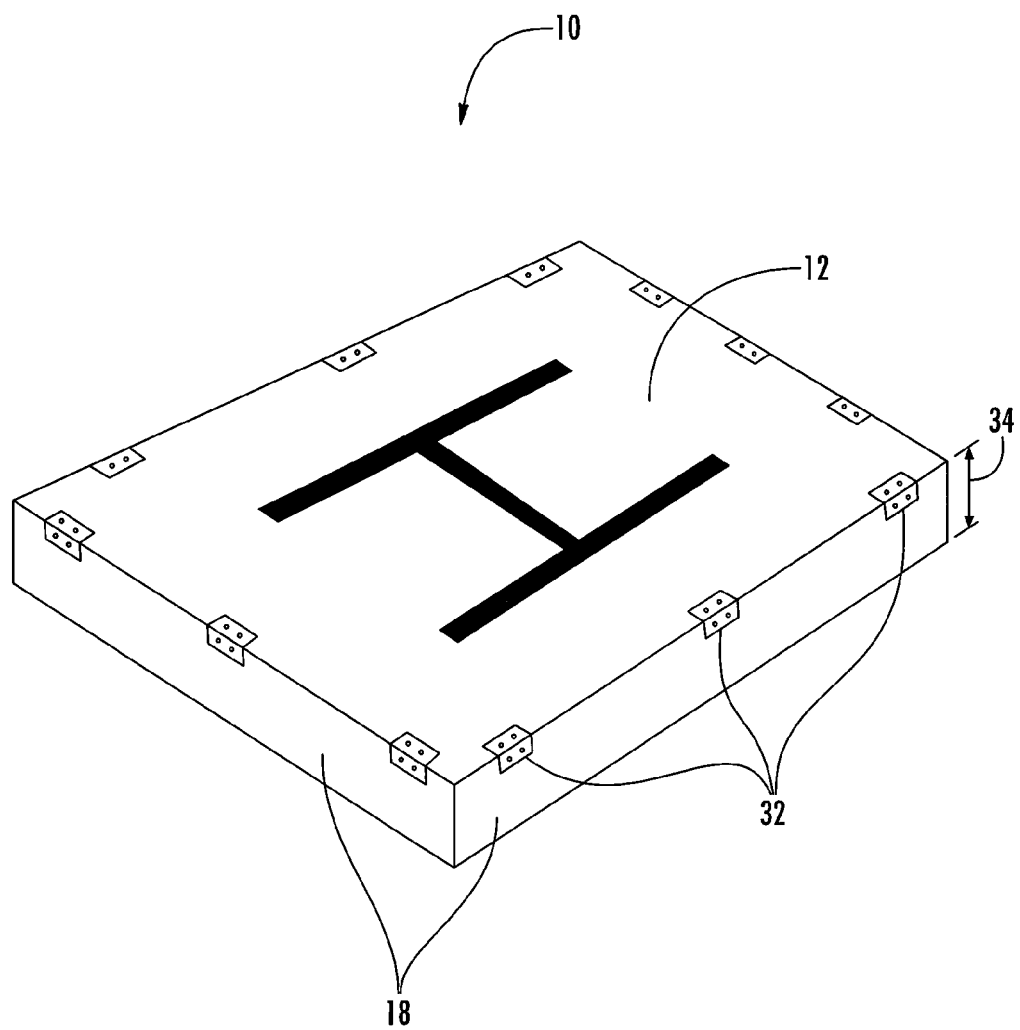
FIG. 2 is another perspective view of the dolly of FIG. 1, with the safety panels unfolded.

According to an embodiment of the present invention, referring to FIGS. 1 and 2, a helicopter dolly 10 includes a platform 12 defining a helicopter landing area 14, and a plurality of rollers 16 attached to the platform 12. The dolly 10 further includes a plurality of safety panels 18 connected to edges of the platform 12 and repositionable relative thereto between folded (FIG. 1) and unfolded (FIG. 2) positions, as well as one or more tow bar connection points 20 for transportation. The safety panels 18 are hingedly connected to the platform 12.

Directional terms, such as bottom, side, front and rear are referenced to an orientation in which the dolly 10 is placed on the ground with the depicted tow bar connection points 20 facing forwards. However, the present invention is not thereby limited to use in any particular orientation.

Referring to FIGS. 1 and 2, the platform 12 and the helicopter landing area 14 defined therein are substantially rectangular in form. The plurality of rollers 16 are mounted to the bottom of the platform 12 with a plurality of fasteners, thereby creating a vertical clearance 22 between the platform 12 and the ground. The rollers 16 are generally mounted across a front and rear portion of the bottom of the platform 12, although they may be mounted across a middle portion of the bottom of the platform 12 as well. To allow the dolly 10 to make turn more easily, the front rollers 16 are adapted to swivel while the rear and middle rollers 16 are mounted rigidly. Each roller 16 can be equipped with a locking mechanism to provide additional stability to the dolly 10 during helicopter landing. The term "roller" is used to generically indicate a structure that supports the platform 12 for sliding notion related to the underlying surface. Nonlimiting examples include casters and other wheels.

In the depicted embodiment, a plurality of foldable safety panels 18 include a front panel 24, a rear panel 26 and side panels 28, 30. The safety panels 18 are connected to the platform 12 with a plurality of hinges 32 along the edges of the platform 12 and are movable between folded and unfolded positions. The front and rear panels 24, 26 are foldable inwardly for lying flat upon the top of the platform 12. The side panels 28, 30 are also foldable inwardly to lay on top of the front and rear panels 24, 26 in the folded position as seen in FIG. 1, or vice versa.

Referring more particularly to FIG. 2, when the safety panels 18 are unfolded, the safety panels 18 extend generally perpendicularly downward from the edges of the platform 12, effectively making the dolly 10 into a monolithic structure that is flush with the ground. Advantageously, the unfolded safety panels 18 cover the space created by the rollers 16, preventing the helicopter skids from being lodged underneath the platform 12 during the landing. Widths of the safety panels 18 are approximately equal to a height 34 of the dolly, and a length of each safety panel 18 is equal to a length of its respective platform edge. Advantageously, these dimensions allow the safety panels 18 to completely cover the space under the platform 12 when the safety panels 18 are unfolded.

The tow bar connection points 20 are affixed along the front portion of the bottom of the platform 12, allowing a detachable tow bar (not shown) to be connected with the tow bar connection points 20. The dolly 10 with the detachable tow bar connected thereto makes it easier to reposition the helicopter around with a tractor or the like. Preferably, the tow bar connection points 20 and tow bar are made out of heavy duty steel, but they could be made out of any material having sufficient strength to pull the dolly 10 with the helicopter thereon.

Preferably, the platform 12 and safety panels 18 are made out of metal, but any sufficiently durable material could be used. Overall dimensions of the dolly 10 when assembled should be large enough so that after helicopter lands onto the platform 12, the safety panels 18 should be able to fold onto the platform 12.

Figure 3:
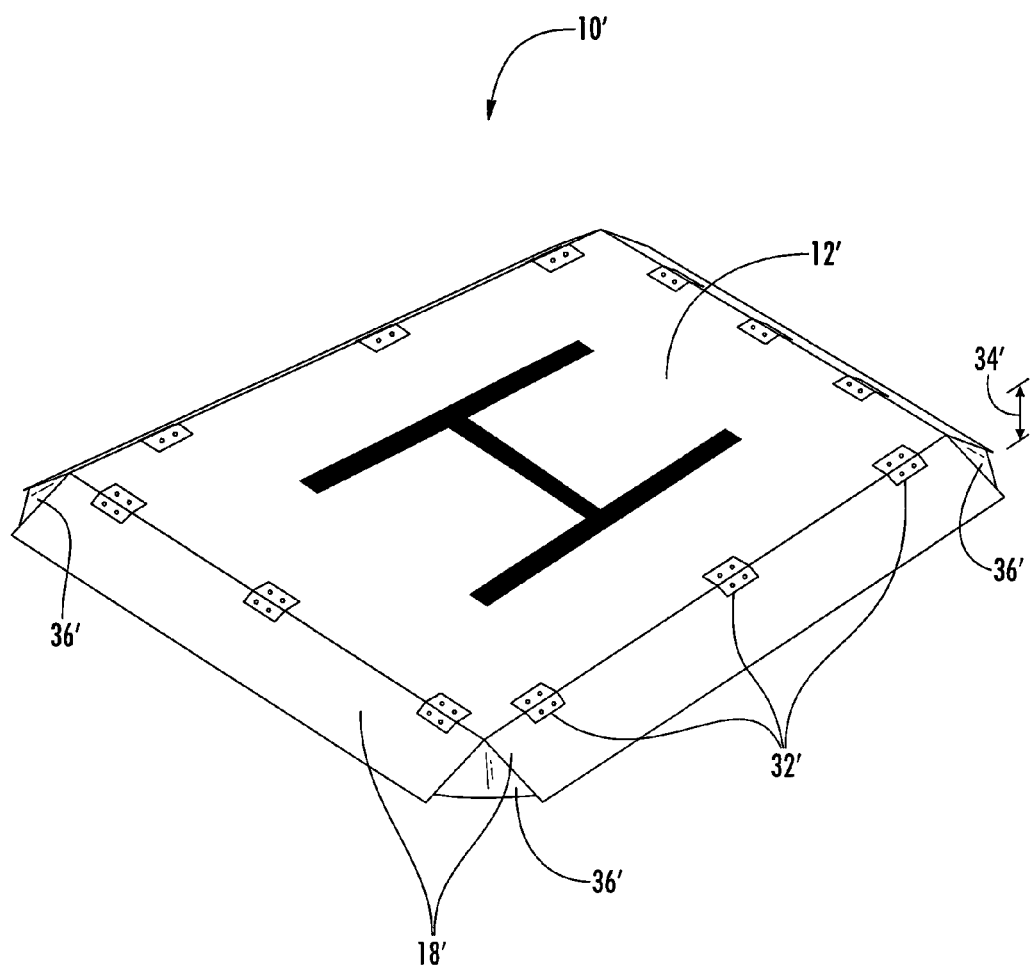
FIG. 3 is a perspective view of the dolly, according to another embodiment of the present invention, with a plurality of safety panels unfolded.
Figure 4:
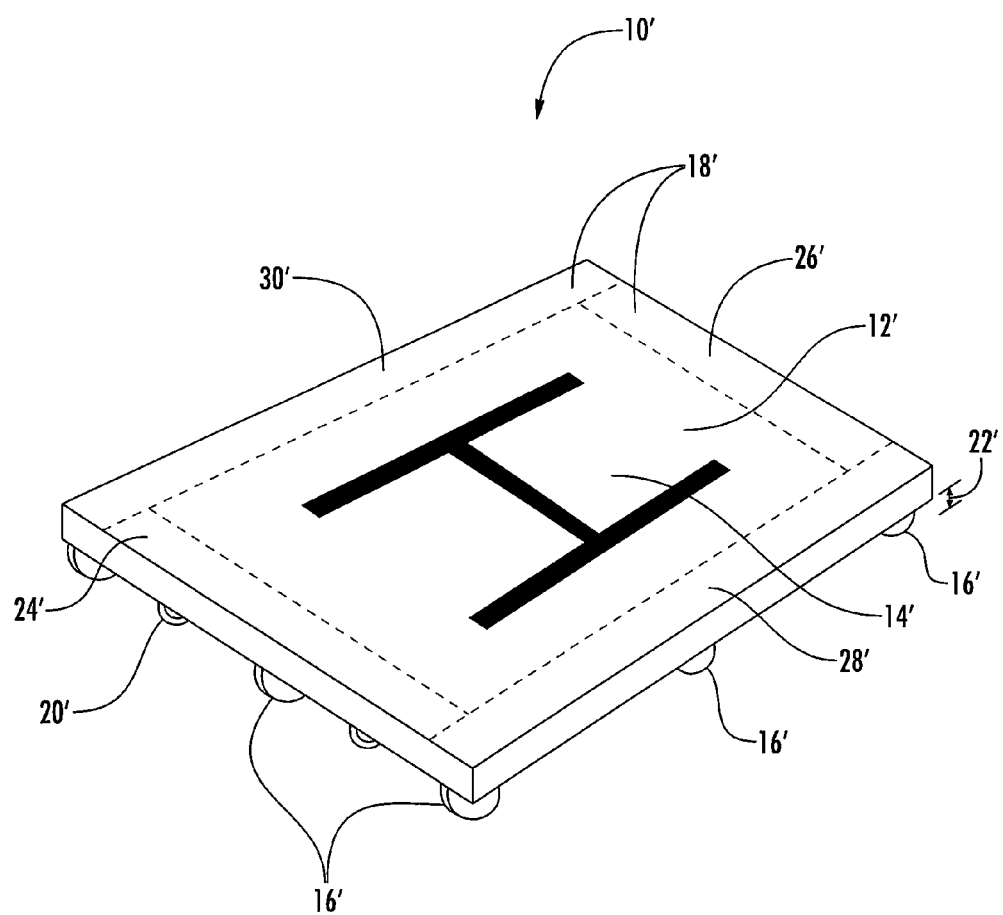
FIG. 4 is a perspective view of the dolly of FIG. 3, with the safety panels stowed.

Referring to FIG. 3, in an alternate embodiment, a helicopter dolly 10' includes safety panels 18' having a width greater than the height 34' of the dolly 10'. Consequently, when the safety panels 18' are extended, they angle downwardly and outwardly from the edges of the platform 12'. Corner members 36' cover the gaps created between adjacent ends of the outwardly-sloped safety panels 18'. The corner members 36' can be made out a sufficiently flexible material, such as ballistic nylon, to remain attached while folding/stowing the panels 18' or can be removable. Referring to FIG. 4, the safety panels 18' can slide under the platform 12' for stowage, rather than folding on the top of the platform 12'.

In use of the dolly 10/10', before a pilot attempts to land the helicopter thereon, landing crews on the ground chock or otherwise lock the roller 16/16' wheels and lower all the safety panels 18/18' (FIGS. 2 and 3). Once the helicopter has safely landed on the dolly 10/10', the safety panels 18/18' are raised (FIGS. 1 and 4), and the tow bar is connected to the dolly 10/10' via the tow bar connection points 20/20' so that the dolly 10/10' can be moved to a desired location with a tractor or the like.

From the foregoing, it will be appreciated that a helicopter dolly according to the present invention eliminates or minimizes the risk of helicopter skids from getting caught underneath the platform of the dolly, while retaining the full functionality of a conventional dolly.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A helicopter dolly for a manned helicopter comprising:
   a platform defining a helicopter landing area;
   a plurality of rollers connected to the platform such that a vertical clearance is defined between the platform and the ground;
   a plurality of safety panels movably connected to edges of the platform so as to be movable relative thereto between raised and lowered positions; and
   wherein the plurality of safety panels completely cover the vertical clearance in the lowered position.

2. The helicopter dolly of claim 1, wherein the plurality of rollers are mounted across front and rear portions of the bottom of the platform.

3. The helicopter dolly of claim 2, wherein the plurality of rollers are also mounted across a middle portion of the bottom of the platform.

4. The helicopter dolly of claim 2, wherein at least one of said rollers is equipped with a locking mechanism to prevent rotation thereof.

5. The helicopter dolly of claim 1, wherein, in the raised position, the plurality of safety panels are folded to lay over the top of the platform.

6. The helicopter dolly of claim 5, wherein, in the raised position, ends of a first portion of the plurality of panels overlie ends of a second portion of the plurality of panels.

7. The helicopter dolly of claim 1, wherein, in the raised position, the plurality of safety panels are slid under the platform.

8. The helicopter dolly of claim 1, wherein the plurality of safety panels are hingedly connected to edges of the platform so as to be movable relative thereto between the raised and lowered positions.

9. The helicopter dolly of claim 1, wherein the platform includes front, rear and side edges and the safety panels correspond to respective edges.

10. The helicopter dolly of claim 9, wherein each of the plurality of safety panels has a length equal to a length of its respective platform edge.

11. The helicopter dolly of claim 1, wherein each of the plurality of safety panels has a width greater than the vertical clearance, such that each of the plurality of safety panels slopes outwardly from the platform when in the lowered position.

12. The helicopter dolly of claim 11, further comprising a plurality of corner members wherein the plurality of corner members extend between adjacent ends of each of the plurality of safety panels.

13. The helicopter dolly of claim 12, wherein each of the plurality of corner members is detachable.

14. The helicopter dolly of claim 12, wherein the plurality of corner members are ballistic nylon.

15. The helicopter dolly of claim 1, wherein the helicopter dolly further includes at least one tow bar connection point connected to the platform.

16. The helicopter dolly of claim 1, wherein the platform and the plurality of safety panels are metal.

17. A method of using a helicopter dolly, the method comprising:
   arranging a helicopter dolly for a helicopter landing; and
   moving a plurality of safety panels and a plurality of corner members to cover a vertical clearance between the helicopter dolly and the ground.

18. The method of claim 17, further comprising moving the plurality of safety panels and the plurality of corner members to uncover the vertical clearance after the helicopter landing.

19. The method of claim 17, further comprising moving the helicopter dolly to reposition the helicopter.

20. The method of claim 19, wherein moving the helicopter dolly to reposition the helicopter includes connecting a tow bar to at least one tow bar connection point and moving the helicopter dolly around with a tractor.

* * * * *